United States Patent
Jang et al.

(10) Patent No.: US 10,903,518 B2
(45) Date of Patent: Jan. 26, 2021

(54) METHOD OF PREPARING SULFIDE-BASED SOLID ELECTROLYTE FOR ALL-SOLID BATTERY HAVING ARGYRODITE-TYPE CRYSTAL STRUCTURE

(71) Applicants: Hyundai Motor Company, Seoul (KR); Kia Motors Corporation, Seoul (KR)

(72) Inventors: Yong Jun Jang, Gyeonggi-do (KR); Pil Gun Oh, Seoul (KR); Hong Seok Min, Gyeonggi-Do (KR); Yong Sub Yoon, Seoul (KR); Sa Heum Kim, Gyeonggi-do (KR); Ju Yeong Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 130 days.

(21) Appl. No.: 16/160,150

(22) Filed: Oct. 15, 2018

(65) Prior Publication Data

US 2019/0173127 A1  Jun. 6, 2019

(30) Foreign Application Priority Data

Dec. 6, 2017 (KR) .................. 10-2017-0166552

(51) Int. Cl.
*H01M 10/0562* (2010.01)
*C01B 25/14* (2006.01)
*H01M 10/0525* (2010.01)

(52) U.S. Cl.
CPC ........ *H01M 10/0562* (2013.01); *C01B 25/14* (2013.01); *H01M 10/0525* (2013.01); *C01P 2002/30* (2013.01); *C01P 2002/72* (2013.01); *C01P 2002/82* (2013.01); *C01P 2006/40* (2013.01); *H01M 2300/008* (2013.01)

(58) Field of Classification Search
None
See application file for complete search history.

(56) References Cited

U.S. PATENT DOCUMENTS 9,806,373 B2 * 10/2017 Kambara .............. H01B 1/122

FOREIGN PATENT DOCUMENTS

KR  10-2015-0011300 A  1/2015

* cited by examiner

*Primary Examiner* — Karie O'Neill Apicella
(74) *Attorney, Agent, or Firm* — Mintz Levin Cohn Ferris Glovsky and Popeo, P.C.; Peter F. Corless

(57) ABSTRACT

Disclosed is a method of preparing a sulfide-based solid electrolyte for an all-solid battery having an argyrodite-type crystal structure through a solution process. The method including obtaining a precursor solution by dissolving lithium sulfide, phosphorus sulfide and a halogen compound in a solvent, obtaining a precursor powder by removing the solvent from the precursor solution. Solid electrolyte for an all-solid battery can be produced by such method.

11 Claims, 3 Drawing Sheets

METHOD OF PREPARING SULFIDE-BASED SOLID ELECTROLYTE FOR ALL-SOLID BATTERY HAVING ARGYRODITE-TYPE CRYSTAL STRUCTURE

CROSS-REFERENCE TO RELATED APPLICATION

This application claims, under 35 U.S.C. § 119(a), the benefit of priority to Korean Patent Application No. 10-2017-0166552 filed on Dec. 6, 2017, the entire contents of which are incorporated herein by reference.

TECHNICAL FIELD

The present invention relates to a method of preparing a sulfide-based solid electrolyte for an all-solid battery. In particular, the sulfide-based solid electrolyte may include solid electrolyte crystals having an argyrodite-type crystal structure.

BACKGROUND OF THE INVENTION

A secondary battery has been used as a high-performance energy source for large-capacity power storage devices, such as electric vehicles or battery power storage systems, and for small portable electronic devices, such as mobile phones, camcorders, laptop computers, and the like. Research has progressed into reducing the weight of parts and the power consumption thereof in order to decrease the size of portable electronic devices and realize continuous use for a long period of time.

As a secondary battery, a lithium ion battery typically has high energy density, large capacity per unit area, a low self-discharge rate, and a long life cycle compared to a nickel manganese battery or a nickel cadmium battery. Moreover, there is no memory effect, so it is easy to use and has a long life cycle. However, the lithium ion battery has the risk of explosion at the time of overheating, has ow energy density and power output and thus, it has been considered less likely to serve as a battery for next-generation electric vehicles.

Particularly, since a liquid electrolyte is used, safety problems may arise due to overheating to cause fire. With the goal of overcoming problems with lithium ion batteries using liquid electrolytes, research and development into all-solid lithium ion batteries using solid electrolytes is actively being carried out these days.

All-solid lithium ion batteries typically include solid electrolytes with no ignition problems, and may have a bipolar structure, and thus have a volume energy density at least five times as high as conventional lithium ion batteries.

However, the solid electrolytes used for all-solid lithium ion batteries may be very expensive, and mass production and particle size control thereof may be difficult to realize for the commercialization of all-solid lithium ion batteries. Therefore, thorough research and development into new methods of preparing solid electrolytes that may overcome these limitations is ongoing.

For example, in the related arts, the preparation of a sulfide-based solid electrolyte may use a dry process for mixing solid electrolyte precursors through ball milling. However, the preparation of the sulfide-based solid electrolyte through the dry process as above may be problematic because the milling time may require substantial time, the milled powder should be separated from balls, and the powder should be collected so as to prevent contamination with an external environment, which may undesirably result in complicated processing.

SUMMARY OF THE INVENTION

In preferred aspects, the present invention may provide a method of preparing a sulfide-based solid electrolyte. In one aspect, the method may not include a dry process. In another aspect, the method may be suitable for mass production.

The other aspects of the present invention are not limited to the foregoing, and will be able to be clearly understood through the following description and to be realized by the means described in the claims and combinations thereof.

The term "all-solid cell" or "all-solid battery" as described herein refers to a cell or a battery that includes only solid or substantially solid-state components, such as solid state electrodes (e.g. anode and cathode) and solid electrolyte. Thus, in preferred aspect, an all-solid cell will not include a fluid and/or flowable electrolyte component as a material or component.

Provided herein is a method of preparing a sulfide-based solid electrolyte for an all-solid battery. The method may include: i) obtaining a precursor solution by admixing lithium sulfide, phosphorus sulfide and a halogen compound in a solvent, ii) obtaining a precursor powder by removing at least a portion of the solvent from the precursor solution, and iii) thermally treating the precursor powder. In particular aspect, solid electrolyte crystals may be grown during or after the thermal treating the precursor powder. In particular aspect, such grown solid electrolyte crystals may include an argyrodite-type crystal structure.

The term "argyrodite crystal", "argyrodite crystal system" or "argyrodite-type crystal" as used herein refers to a crystal structure having a crystal structure or system similar to naturally existing $Ag_8GeS_6$ (Argyrodite). The argyrodite crystal may be orthorhombic having $Pna2_1$ space group and having a unit cell of a=15.149, b=7.476, c=10.589 [Å]; Z=4. The argyrodite crystal also may empirically be determined for example, by X-ray diffraction spectroscopy by observing peaks around at $2\theta=15.72°$, $18.16°$, $25.76°$, $30.28°$ and $31.64°$.

The term "lithium sulfide" as used herein refers to a compound including one or more of sulfur atoms and one or more of lithium atoms, or alternatively, one or more of sulfur containing ionic groups and one or more of lithium containing ionic groups. In certain preferred aspects, lithium sulfide may consist of sulfur atoms and lithium atoms.

The term "phosphorus sulfide" as used herein refers to a compound including one or more of sulfur atoms and one or more of phosphorus atoms, or alternatively, one or more of sulfur containing ionic groups and one or more of phosphorus containing ionic groups. In certain preferred aspects, phosphorus sulfide may consist of sulfur atoms and phosphorus atoms. Non-limiting exemplary phosphorus sulfide may include, but not limited to, $P_4S_3$, $P_4S_{10}$, $P_4S_4$, $P_4S_5$, $P_4S_6$, $P_4S_7$, $P_4S_8$, and $P_4S_9$.

The term "halogen compound" as used herein refers to a compound including one or more of halogen atoms such as F, Cl, Br, or I via chemical bond (e.g., ionic bond or covalent bond) to the other atoms constituting the compound. In certain preferred aspect, the halogen compound may include one or more of F, Cl, Br, I, or combinations thereof and one or more metal atoms. In other preferred aspect, the halogen compound may include one or more of F, Cl, Br, I, or combinations thereof and one or more non-metal atoms. Non-limiting examples may suitably include metal halide such as LiF, LiBr, LiCl, LiI, NaF, NaBr, NaCl, NaI, KaF, KBr, KCl, KI, and the like. In certain preferred aspect, the halogen compound suitably for the use in a solid electrolyte in all-solid Li-ion battery may include one or more halogen atoms and Li.

Preferably, the lithium sulfide may include lithium sulfide (Li$_2$S), and the phosphorus sulfide may include phosphorus pentasulfide (P$_2$S$_5$).

Preferably, the halogen compound may be selected from the group consisting of lithium bromide (LiBr), lithium chloride (LiCl), lithium iodide (LiI) and combinations thereof.

The solvent may suitably be selected from one or more of polar or non-polar solvents that may substantially suspend, dissolve or otherwise admix the above described components, e.g., lithium sulfide, phosphorus sulfide and halogen compound. In certain preferred aspect, the solvent may suitably a polar solvent. In certain preferred aspect, the solvent may suitably have a boiling point less than about 500° C., less than about 450° C., less than about 400° C., less than about 450° C., less than about 400° C., less than about 350° C., less than about 300° C., or less than about 250° C. Preferably, the solvent suitably may be selected from the group consisting of ethanol, propanol, butanol, dimethyl carbonate, ethyl acetate, tetrahydrofuran, 1,2-dimethoxyethane, propylene glycol dimethyl ether, acetonitrile and combinations thereof. It is understood that references herein to "a solvent" includes one or more mixed solvents.

In the preparation method of the present invention, the solvent may be removed by drying after obtaining the precursor solution. In certain preferred aspect, the solvent may be removed by drying immediately after obtaining the precursor solution, e.g., dissolving the lithium sulfide, phosphorus sulfide and halogen compound in the solvent. As discussed, suitably at least a portion of the solvent is removed, e.g., at least about 30%, 40%, 50%, 60%, 70%, 80%, 90% or 95%, of the total weight of a solvent used. To admix the components, more typically, as substantial portion of the solvent is removed (e.g., at least about 80, 90, 95, 98, or 99 or more % by weight of the total weight of the solvent used.

In the preparation method of the present invention, the solvent may be removed by drying the precursor solution in a vacuum atmosphere at a temperature ranging from about 25° C. to about 250° C. for about 5 hr to 15 hr.

The term "vacuum atmosphere" as used herein refers to a pressure less than about 760 torr, 1 less than about 600 torr, less than about 450 torr, less than about 300 torr, less than about 200 torr, less than about 100 torr, less than about 50 torr, less than about 40 torr, less than about 30 torr, less than about 25 torr, less than about 20 torr, less than about 15 torr, less than about 10 torr, less than about 5 torr, less than about 1 torr, less than about 0.1 torr, less than about 0.01 torr, or less than about 0.1 torn. In certain preferred aspect, the vacuum atmosphere may be under the pressure ranging from about 1 torr to about 300 torr, from about 1 torr to about 200 torr, from about 1 torr to about 100 torr, from about 1 torr to about 50 torr, from about 1 torr to about 30 torr, from about 1 torr to about 20 torr, or from about 1 torr to about 10 torr. In the preparation method of the present invention, the solvent may be removed by subjecting the precursor solution in a vacuum atmosphere to first drying at a temperature ranging from about 25° C. to less than about 50° C. for about 1 hr to 3 hr, second drying at a temperature ranging from about 50° C. to less than about 100° C. for about 1 hr to 3 hr, third drying at a temperature ranging from about 100° C. to less than about 150° C. for about 1 hr to 3 hr, fourth drying at a temperature ranging from about 150° C. to less than about 200° C. for about 1 hr to 3 hr, and/or fifth drying at a temperature ranging from about 200° C. to less than about 250° C. for about 1 hr to 3 hr.

The first drying to the fifth drying may be performed under continuous or non-continuous heating conditions, for example, at a temperature within the range from a lower limit of about 25° C. to an upper limit of about 200° C. to about 250° C.

In the preparation method of the present invention, the precursor powder may be thermally treated at a temperature of about 400° C. to 600° C. for about 1 hr to 5 hr.

Preferably, the precursor powder may be thermally treated by elevating a temperature from room temperature to about 150° C. at a rate of about 2.5° C./min-10° C./min, from about 150° C. to about 250° C. at a rate of about 2.5° C./min-5° C./min, from about 250° C. to about 400° C. at a rate of about 1° C./min-2.5° C./min, and/or from about 400° C. to about 550° C. at a rate of 1° C./min.

The sulfide-based solid electrolyte may suitably include the argyrodite-type crystal structure, as represented by Chemical Formula 1:

$$Li_6PS_5X,\qquad\text{[Chemical Formula 1]}$$ 

wherein X is Cl, Br or I.

Further provided is a solid electrolyte for an all-solid battery that may include a compound having an argyrodite-type crystal structure and represented by Chemical Formula 1, $$Li_6PS_5X,\qquad\text{[Chemical Formula 1]}$$ 

wherein X is Cl, Br or I.

Still further provided is an all-solid battery that may include the solid electrolyte manufactured by the method as described herein, a cathode, and an anode.

Also provided is a vehicle that may include the all-solid battery as described herein.

According to various exemplary preparation method of the present invention, a sulfide-based solid electrolyte may be mass-produced in a simple manner, thus remarkably increasing price competitiveness. In addition, an argyrodite-type sulfide-based solid electrolyte having high lithium ion conductivity may be obtained.

Other aspects of the invention are disclosed infra.

DETAILED DESCRIPTION

Figure 1:
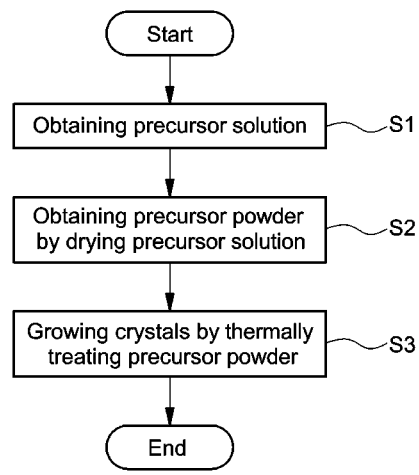
FIG. 1 shows an exemplary process of preparing an exemplary sulfide-based solid electrolyte for an exemplary all-solid battery having an argyrodite-type crystal structure according to an exemplary embodiment of the present invention.

The above and other aspects, features and advantages of the present invention will be more clearly understood from the following exemplary embodiments taken in conjunction with the accompanying drawings. However, the present invention is not limited to the embodiments disclosed herein, but may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a first element discussed below could be termed a second element without departing from the scope of the present invention. Similarly, the second element could also be termed a first element. As used herein, the singular forms are intended to include the plural forms as well, unless the context clearly indicates otherwise.

It will be further understood that the terms "comprise", "include", "have", etc. when used in this specification specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are taken to mean that these numbers are approximations including various uncertainties of the measurements that essentially occur in obtaining these values among others, and thus should be understood to be modified by the term "about" in all cases. Furthermore, when a numerical range is disclosed in this specification, such a range is continuous and includes all values from the minimum value of said range to the maximum value thereof, unless otherwise indicated. Moreover, when such a range refers to an integer, all integers including the minimum value to the maximum value are included unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between the valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like and up to 30%, and will also be understood to include any value between the valid integers within the stated range, such as 10.5%, 15.5%, 25.5%, and the like.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 shows an exemplary process of preparing an exemplary sulfide-based solid electrolyte for an exemplary all-solid battery having an argyrodite-type crystal structure according to an exemplary embodiment of the present invention. With reference thereto, the preparation method of the present invention may include obtaining a precursor solution by dissolving materials such as raw materials for a solid electrolyte in a solvent (S1), obtaining a precursor powder by removing the solvent from the precursor solution (S2) and growing solid electrolyte crystals by thermally treating the precursor powder (S3).

Obtaining the precursor solution (S1) may include dissolving the raw materials for a solid electrolyte in a solvent.

The raw materials may include lithium sulfide, phosphorus sulfide and a halogen compound.

The lithium sulfide may include lithium sulfide ($Li_2S$), and the phosphorus sulfide may include phosphorus pentasulfide ($P_2S_5$).

The halogen compound may be selected from the group consisting of lithium bromide (LiBr), lithium chloride (LiCl), lithium iodide (LiI) and combinations thereof.

The solvent may be a polar solvent, which is able to dissolve the lithium sulfide, phosphorus sulfide and halogen compound, and may be specifically selected from the group consisting of ethanol, propanol, butanol, dimethyl carbonate, ethyl acetate, tetrahydrofuran, 1,2-dimethoxyethane, propylene glycol dimethyl ether, acetonitrile and combinations thereof.

The composition of the raw materials is not particularly limited, and may vary so as to be suitable for the composition of the desired sulfide-based solid electrolyte.

The conditions for dissolving the raw materials in the solvent are not particularly limited, and for example, stirring may be performed at a temperature where degradation of the lithium sulfide, phosphorus compound and halogen compound or reaction therebetween does not occur for a period of time required to completely dissolve the raw materials in the solvent.

The precursor powder may be obtained by removing the solvent from the precursor solution (S2).

The precursor powder indicates a powder in which the raw materials are physically and chemically mixed, some of which are formed into crystals, which is described in detail in Example.

Obtaining the precursor powder (S2) may include removing the solvent by drying the precursor solution immediately after obtaining the precursor solution. Here, the term "immediately" means "without delay after confirmation of the dissolution of the raw materials in the solvent", and specifically indicates directly drying the solvent without additional reaction through continuous stirring of the precursor solution at a high temperature for a predetermined period of time. This is because the raw materials may sufficiently react under time and temperature conditions for drying the solvent.

Obtaining the precursor powder (S2) may include removing the solvent by drying the precursor solution in a vacuum atmosphere at a temperature ranging from about 25° C. to about 250° C. for about 5 hr to 15 hr. If the drying conditions are less than about 25° C. and/or less than about 5 hr, the solvent may not be sufficiently removed, and the reaction of the raw materials may become insufficient. On the other hand, if the drying conditions is greater than about 250° C. and/or about 15 hr, the raw materials, especially phosphorus sulfide, may degrade.

The drying of the precursor solution may be performed in a vacuum atmosphere through two or more continuous drying processes at different temperatures. Preferably, a first drying at a temperature ranging from about 25° C. to less than about 50° C. for about 1 hr to 3 hr, a second drying at a temperature ranging from about 50° C. to less than about 100° C. for 1 hr to 3 hr, a third drying at a temperature ranging from about 100° C. to less than about 150° C. for about 1 hr to 3 hr, a fourth drying at a temperature ranging from 150° C. to less than about 200° C. for 1 hr to 3 hr, and/or a fifth drying at a temperature ranging from about 200° C. to less than about 250° C. for about 1 hr to 3 hr may be carried out.

Here, the temperature for the first drying to the fifth drying may start from 25° C. and may be continuously or non-continuously elevated up to the range of about 200° C. to about 250° C. For example, non-continuous drying may be performed in such a manner that first drying at a temperature of about 25° C., the second drying at a temperature of about 50° C., the third drying at a temperature of about 100° C., the fourth drying at a temperature of about 150° C., and the fifth drying at a temperature of about 200° C. may be carried out, in which the temperature may be elevated as fast as possible from any one stage to the next stage. On the other hand, continuous drying may be performed in such a manner that the temperature may start from about 25° C. and is slowly elevated to about 50° C. for a preset period of time ranging from about 1 hr to 3 hr (first drying), and the temperature is slowly elevated from about 50° C. to about 100° C. for a preset period of time ranging from about 1 hr to 3 hr (second drying). The continuous or non-continuous heating conditions may be appropriately adjusted depending on the preset drying time.

Thermally treating the precursor powder (S3) may include obtaining the sulfide-based solid electrolyte having an argyrodite-type crystal structure by growing crystals of the precursor powder formed during the drying of the precursor solution.

The precursor powder may be thermally treated at a temperature of about 400° C. to 600° C. for about 1 hr to 5 hr. For example, thermal treatment may be conducted in a manner in which the temperature is elevated from room temperature to about 150° C. at a rate of about 2.5° C./min about -10° C./min, from about 150° C. to about 250° C. at a rate of 2.5° C./min to about 5° C./min, from about 250° C. to about 400° C. at a rate of about 1° C./min to about 2.5° C./min, and/or from about 400° C. to about 550° C. at a rate of about 1° C./min.

If the conditions for thermal treatment are less than about 400° C. and/or less than about 1 hr, crystals may not be sufficiently grown. On the other hand, if the conditions for thermal treatment is greater than about 600° C. and/or about 5 hr, the solid electrolyte may degrade, thus reducing ion conductivity.

The sulfide-based solid electrolyte having an argyrodite-type crystal structure prepared by the present invention may be represented by Chemical Formula 1:

$Li_6PS_5X$         [Chemical Formula 1]

In Chemical Formula 1, X is Cl, Br or I.

EXAMPLE

A better understanding of the present invention will be given through the following examples, which are merely set forth to illustrate, but are not to be construed as limiting the present invention.

Example—Preparation of Sulfide-Based Solid Electrolyte (S1) 4.28 g of a lithium sulfide powder (made by Sigma Aldrich), 4.14 g of a phosphorus pentasulfide powder (made by Sigma Aldrich) and 1.57 g of a lithium chloride powder (made by Sigma Aldrich) were weighed and mixed. The resulting mixture was dissolved in 100 g of an acetonitrile solvent to give a precursor solution. The raw materials were stirred at room temperature until all the raw materials were dissolved.

(S2) The precursor solution was dried in a vacuum at about 200° C. for about 12 hr, thus completely removing the acetonitrile solvent. Thereby, a precursor powder was obtained.

(S3) The precursor powder was thermally treated at a temperature of about 550° C. for about 5 hr, thus obtaining a sulfide-based solid electrolyte.

Preparation Example—Manufacture of all-Solid Battery

An all-solid battery, configured to include the above sulfide-based solid electrolyte and to include a cathode, an anode, and a solid electrolyte layer disposed between the cathode and the anode, was manufactured.

(Solid electrolyte layer) A solid electrolyte layer having a thickness of 500 μm was formed by subjecting the sulfide-based solid electrolyte of Example to compression molding.

(Cathode) A cathode having a thickness of 30 μm was formed on one side of the solid electrolyte layer using a powder comprising an active material (niobium-doped lithium nickel cobalt manganese-based active material, Nb-doped NCM-622), the sulfide-based solid electrolyte of Example and a conductive additive (Super C), which were mixed together. The amount of loaded active material for the cathode was 5.8 mg/cm².

(Anode) An anode was formed by attaching a piece of lithium foil having a thickness of 100 μm to the remaining side of the solid electrolyte layer.

Test Example 1—Raman Spectroscopy of Precursor Powder

Figure 2:
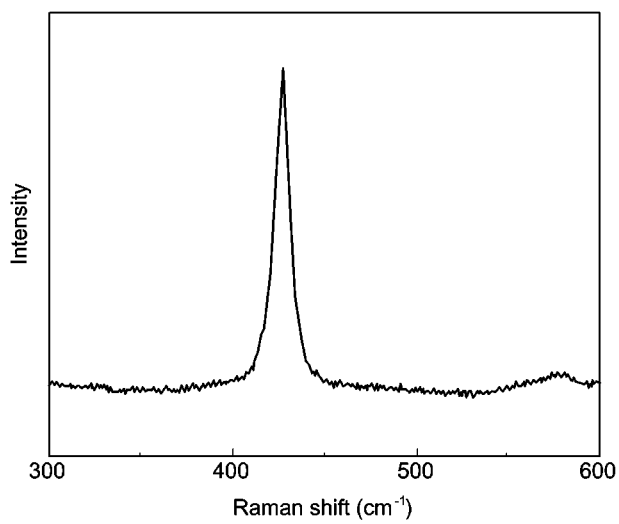
FIG. 2 shows the results of Raman spectroscopy of crystals of an exemplary precursor powder obtained in step S2 of Example according to an exemplary embodiment of the present invention.

The crystals of the precursor powder obtained in step S2 of Example were analyzed through Raman spectroscopy. The results are shown in FIG. 2. The formation of $PS_4^{3-}$ crystals on the precursor powder was confirmed. This means that a crystalline solid electrolyte can be obtained by the preparation method of the present invention.

Figure 3:
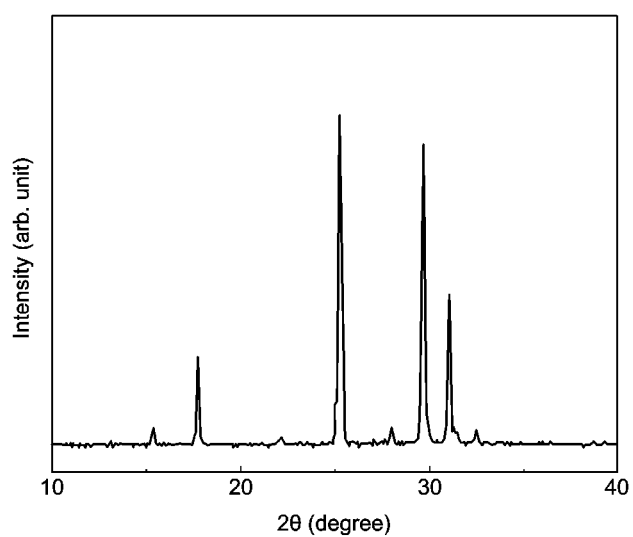
FIG. 3 shows the results of X-ray diffraction spectroscopy of an exemplary sulfide-based solid electrolyte prepared in Example according to an exemplary embodiment of the present invention.

Test Example 2—X-Ray Diffraction Spectroscopy of Sulfide-Based Solid Electrolyte The sulfide-based solid electrolyte prepared in Example was subjected to X-ray diffraction spectroscopy. The results are shown in FIG. 3. The argyrodite crystal peaks were observed at 2θ=15.720, 18.16°, 25.76°, 30.28° and 31.64°, from which the sulfide-based solid electrolyte was determined to have an argyrodite-type crystal structure.

Test Example 3—Measurement of Lithium Ion Conductivity of Sulfide-Based Solid Electrolyte The sulfide-based solid electrolyte prepared in Example was subjected to compression molding to thus produce a molded measurement body (diameter of 13 mm, thickness of 0.6 mm). AC potential of 10 mV was applied to the molded body, and impedance was measured at a frequency sweep of $1 \times 10^6$ to 100 Hz, and thus the lithium ion conductivity of the sulfide-based solid electrolyte was found to be very high, specifically $2.0 \times 10^{-3}$ S/cm. Therefore, according to the preparation method of the present invention, a sulfide-based solid electrolyte having high ion conductivity can be obtained.

Test Example 4—Measurement of Discharge Capacity of all-Solid Battery

Figure 4:
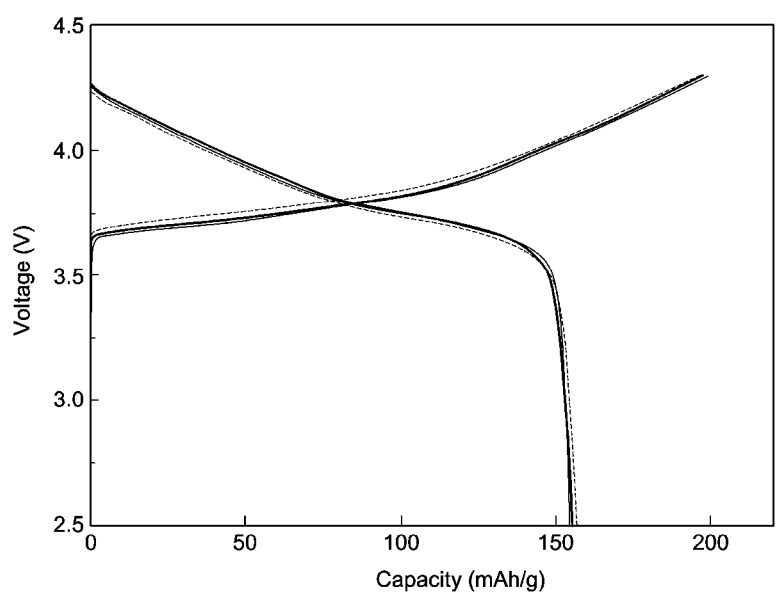
FIG. 4 shows the results of measurement of discharge capacity through charge-discharge testing of an all-solid battery of Preparation Example according to the present invention.

The all-solid battery of Preparation Example was subjected to charge-discharge testing at a rate of 0.02 C under conditions of CC (constant current) of 2.0 V-3.58 V to thus measure the discharge capacity thereof. The results are shown in FIG. 4. The discharge capacity of the all-solid battery was about 160 mAh/g.

Although preferred exemplary embodiments of the present invention have been described with reference to the accompanying drawings, those skilled in the art will appreciate that the present invention may be embodied in other specific forms without changing the technical spirit or essential features. Thus, embodiments described above should be understood to be illustrative in every way and non-limiting.

What is claimed:

1. A method of preparing a sulfide-based solid electrolyte for an all-solid battery, comprising:
    obtaining a precursor solution by admixing lithium sulfide, phosphorus sulfide and a halogen compound in a solvent;
    obtaining a precursor powder by removing at least a portion of the solvent from the precursor solution; and
    thermally treating the precursor powder,
    wherein the solvent is removed by subjecting the precursor solution in a vacuum atmosphere to first drying at a temperature ranging from about 25° C. to less than about 50° C. for about 1 hr to 3 hr, second drying at a temperature ranging from about 50° C. to less than about 100° C. for about 1 hr to 3 hr, third drying at a temperature ranging from about 100° C. to less than about 150° C. for about 1 hr to 3 hr, fourth drying at a temperature ranging from about 150° C. to less than about 200° C. for about 1 hr to 3 hr, and/or fifth drying at a temperature ranging from about 200° C. to less than about 250° C. for about 1 hr to 3 hr, two or more of the first drying to the fifth drying are performed under continuous or non-continuous heating.

2. The method of claim 1, wherein solid electrolyte crystals are grown during or after thermally treating the precursor powder.

3. The method of claim 2, wherein the grown solid electrolyte crystals comprise an argyrodite-type crystal structure.

4. The method of claim 1, wherein the lithium sulfide comprises lithium sulfide ($Li_2S$), and the phosphorus sulfide comprises phosphorus pentasulfide ($P_2S_5$).

5. The method of claim 1, wherein the halogen compound is selected from the group consisting of lithium bromide (LiBr), lithium chloride (LiCl), lithium iodide (LiI) and combinations thereof.

6. The method of claim 1, wherein the solvent is selected from the group consisting of ethanol, propanol, butanol, dimethyl carbonate, ethyl acetate, tetrahydrofuran, 1,2-dimethoxyethane, propylene glycol dimethyl ether, acetonitrile and combinations thereof.

7. The method of claim 1, wherein the solvent is removed by drying after obtaining the precursor solution.

8. The method of claim 1, wherein the solvent is removed by drying the precursor solution in a vacuum atmosphere at a temperature ranging from about 25° C. to about 250° C. for about 5 hr to about 15 hr.

9. The method of claim 1, wherein the precursor powder is thermally treated at a temperature of about 400° C. to 600° C. for about 1 hr to 5 hr.

10. The method of claim 9, wherein the precursor powder is thermally treated by elevating a temperature from room temperature to about 150° C. at a rate of about 2.5° C./min-10° C./min, from about 150° C. to about 250° C. at a rate of about 2.5° C./min-5° C./min, from about 250° C. to about 400° C. at a rate of about 1° C./min-2.5° C./min, and/or from about 400° C. to about 550° C. at a rate of about 1° C./min.

11. The method of claim 1, wherein the sulfide-based solid electrolyte comprises the argyrodite-type crystal structure, as represented by Chemical Formula 1:

[Chemical Formula 1]

$Li_6PS_5X$, wherein X is Cl, Br or I.

* * * * *